(12) United States Patent
Rho

(10) Patent No.: US 7,649,596 B2
(45) Date of Patent: Jan. 19, 2010

(54) DISPLAY PANEL AND METHOD OF MANUFACTURING THE SAME, AND TRANSFLECTIVE LIQUID CRYSTAL DISPLAY WITH THE SAME

(75) Inventor: Soo-Guy Rho, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 619 days.

(21) Appl. No.: 11/382,214

(22) Filed: May 8, 2006

(65) Prior Publication Data

US 2006/0256265 A1    Nov. 16, 2006

(30) Foreign Application Priority Data

May 16, 2005    (KR) .................. 10-2005-0040658

(51) Int. Cl.
  *G02F 1/1335* (2006.01)
(52) U.S. Cl. .................. 349/114; 349/106; 349/113
(58) Field of Classification Search ......... 349/106–107, 349/113–114
  See application file for complete search history.

(56) References Cited

U.S. PATENT DOCUMENTS 6,580,480 B2 *   6/2003   Baek et al. .................. 349/114
2002/0036730 A1   3/2002   Baek et al.

FOREIGN PATENT DOCUMENTS

JP    2003330008    11/2003

* cited by examiner

*Primary Examiner*—Frank G Font
*Assistant Examiner*—Michael P Mooney
(74) *Attorney, Agent, or Firm*—Cantor Colburn LLP

(57) ABSTRACT

An LCD with a transmission area and a reflection area includes a first substrate, a gate line and a data line formed on the first substrate, a TFT that is connected to the gate line and the data line, a pixel electrode that is connected to the TFT and includes a transparent electrode and a reflective electrode, a second substrate facing the first substrate, a plurality of convex-shaped protrusions that are placed at the refection area and are formed on the second substrate, and a color filter formed on the protrusions and on the second substrate.

33 Claims, 7 Drawing Sheets

DISPLAY PANEL AND METHOD OF MANUFACTURING THE SAME, AND TRANSFLECTIVE LIQUID CRYSTAL DISPLAY WITH THE SAME

BACKGROUND OF THE INVENTION (a) Field of the Invention

The present invention relates generally to a liquid crystal display (LCD) and, more particularly, to a display panel used for a transflective LCD and a method of manufacturing the same.

(b) Description of the Related Art

Generally, an LCD includes a pair of panels each having electrodes formed on the inner surface, and a dielectric anisotropy liquid crystal (LC) layer interposed between the panels. Two polarizers are separately attached to the outer surfaces of the panels. In the LCD, a variation in the strength of an electric field generated by the electrodes changes the orientations of LC molecules in the LC layer, and the orientations of the LC molecules determine the polarization of light passing through the LC layer. At this time, the polarizers either pass or block the polarized light to produce white (or clear) or black (or dark) regions. As a result, a desired image display is realized.

LCDs are non-emissive displays and they do not produce any form of light. Accordingly, the LCDs utilize artificial light emitted from lamps of a backlight unit separately provided, or ambient light, as a light source.

Depending on kinds of the light source used for the image display, the LCDs are divided into three types: transmissive, reflective, and transflective (transmissive-reflective). In transmissive LCDs, the pixels are illuminated from behind using a backlight. In reflective LCDs, the pixels are illuminated from the front using incident light originating from the ambient environment. Transflective LCDs combine transmissive and reflective characteristics. Under medium light conditions, such as an indoor environment, or under complete darkness conditions, these LCDs are operated in a transmissive mode, while under very bright conditions, such as an outdoor environment, they are operated in a reflective mode. The reflective and transflective LCDs are commonly used in small and medium size display devices.

In a transflective LCD, there are transmission areas and reflection areas. In the reflection areas exterior light passes through color filters twice because of reflection, while in the transmission areas light emitted from the backlight that is provided behind an LCD panel assembly passes through the color filter only once. Due to these characteristics, the difference of color tone between the transmission areas and the reflection areas may occur.

There are two commonly used methods to solve the above-mentioned problem. The first method is to form the color filters of the transmission areas more thickly than the color filters of the reflection areas. The second method is to form light holes in the color filters of the reflection areas.

However, the latter method has some drawbacks. In this method, after the formation of the holes, an overcoat layer is coated on all the color filters in order to compensate a step difference between the color filters with the holes and the color filters without the holes and thus to create a planarized surface. In this case, however, perfect planarization is technically impossible. Accordingly, even if the overcoat layer is formed on all the color filters, a cell gap at the reflection area with the holes and a cell gap at the transmission area without the holes are different from each other. Also, the common electrode is depressed in the vicinities of the holes. Accordingly, the orientations of the LC molecules become poor and those molecules may be abnormally operated.

SUMMARY OF THE INVENTION

The present invention reduces a difference of color tone between a transmission area and a reflection area.

According to an aspect of the present invention, there is provided a display panel for a transflective LCD with a transmission area and a reflection area, including a substrate, a plurality of convex-shaped protrusions that are formed on the substrate and are placed at the refection area, and a color filter formed on the protrusions and the substrate.

In this structure, the protrusions may include a transparent organic material. Each protrusion may have a diameter of 10 μm to 15 μm and a height of 1 μm to 2 μm, and the protrusions may have the same size or different sizes.

The color filter may have a flat top surface.

The display panel may further include a light-blocking member that is formed on the substrate.

The display panel may further include a common electrode that is formed on the color filter.

The display panel may further include an overcoat layer that is formed between the color filter and the common electrode.

According to another aspect of the present invention, there is provided an LCD with a transmission area and a reflection area, including a first substrate, a gate line and a data line that are formed on the first substrate, a thin film transistor (TFT) that is connected to the gate line and the data line, a pixel electrode that is connected to the TFT and includes a transparent electrode and a reflective electrode, a second substrate that is opposite to the first substrate, a plurality of convex-shaped protrusions that are placed at the refection area and are formed on the second substrate, and a color filter formed on the protrusions and on the second substrate.

In this structure, the protrusions may include a transparent organic material. Each protrusion may have a diameter of 10 μm to 15 μm and a height of 1 μm to 2 μm, and the protrusions may have the same size or different sizes.

The color filter may have a flat top surface.

The transparent electrode is formed at the transmission area and the reflection area, while the reflective electrode is formed at the reflection area. The reflective electrode is formed on the transparent electrode.

The LCD may further include an upper passivation layer and a lower passivation layer that are formed between the TFT and the pixel electrode. The upper passivation layer may include an aperture where the lower passivation layer is exposed, and it may have an uneven top surface.

The LCD may further include a light-blocking member that is formed on the second substrate.

The LCD may further include a common electrode that is formed on the color filter.

The LCD may further include an overcoat layer that is formed between the color filter and the common electrode.

According to still another aspect of the present invention, there is provided a method of manufacturing a display panel for an LCD, which includes the steps of providing a substrate, forming convex-shaped protrusions on the substrate, and forming a color filter on the protrusions and the substrate.

The step of forming convex-shaped protrusions includes forming a photosensitive organic layer over the substrate, selectively exposing the substrate to light through a mask, developing the substrate, and baking the substrate.

The mask used in the step of forming convex-shaped protrusions may be a slit-type mask.

Each protrusion may have a diameter of 10 μm to 15 μm and a height of 1 μm to 2 μm, and the protrusions may have the same size or different sizes.

The color filter may have a flat top surface.

The step of forming a light-blocking member on the substrate may be further included in this method.

The step of forming a common electrode on the color filter may be further included in this method.

The step of forming an overcoat layer that is formed between the color filter and the common electrode may be further included in this method.

BRIEF DESCRIPTION OF THE DRAWINGS

The above objects and other advantages of the present invention will become more apparent by describing the preferred embodiments thereof in more detail with reference to the accompanying drawings.

DETAILED DESCRIPTION OF THE PREFERRED EMBODIMENTS

Figure 1:
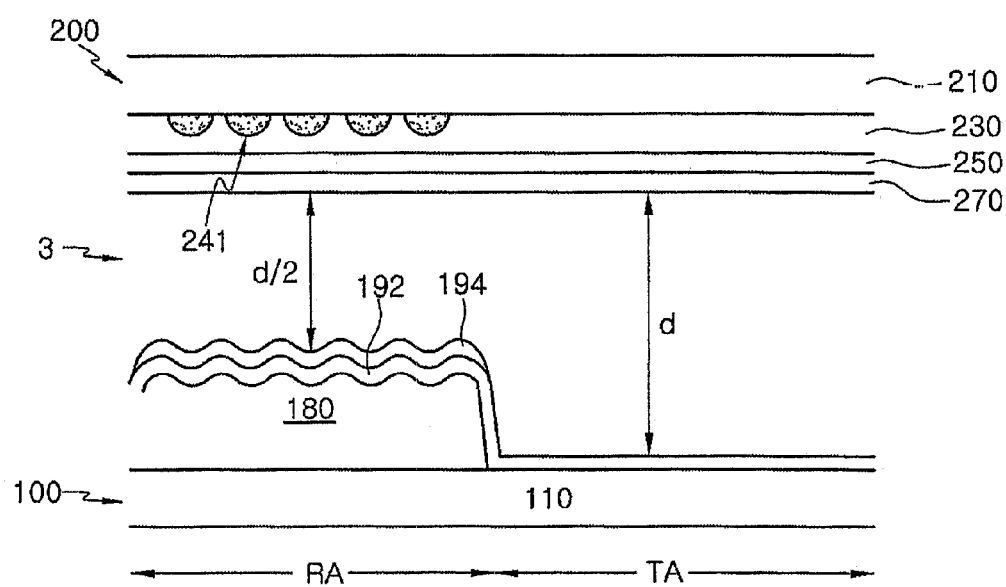
FIG. 1 is a schematic cross-sectional view of an LCD according to an embodiment of the present invention.

Preferred embodiments of the present invention will be described more fully hereinafter with reference to the accompanying drawings, in which preferred embodiments of the invention are shown. The present invention may, however, be embodied in different forms and should not be construed as being limited to the embodiments set forth herein. Rather, these embodiments are provided so that this disclosure will be thorough and complete, and will fully convey the scope of the invention to those skilled in the art.

In the drawings, the thickness of the layers, films, and regions are exaggerated for clarity. Like numerals refer to like elements throughout. It will be understood that when an element such as a layer, film, region, or substrate is referred to as being "on" another element, it can be directly on the other element or intervening elements may also be present.

Hereinafter, an LCD according to a preferred embodiment of the present invention will be described in detail with reference to accompanying drawings.

FIG. 1 is a schematic cross-sectional view of an LCD according to an embodiment of the present invention.

Referring to FIG. 1, the LCD of this embodiment comprises a TFT array panel 100 and a common electrode panel 200 facing each other, and an LC layer 3 interposed therebetween.

The TFT array panel 100 comprises an insulating substrate 110, switching elements (not shown) and a passivation layer 180 formed on the insulating layer 110, and pixel electrodes 190 formed on the passivation layer 180. Each pixel electrode 190 is comprised of a transparent electrode 192 and a reflective electrode 194 overlying a partial portion of the transparent electrode 192.

The common electrode panel 200 comprises an insulating substrate 210, and color filters 230, an overcoat 250 and a common electrode 270 formed on the substrate 210.

In a transreflective LCD, there are transmission areas TA defined by the transparent electrodes 192 and reflection areas RA defined by the reflective electrodes 194. In more detail, the transmission area TA is a section of portions disposed on and under an exposed portion of the transparent electrodes 192 in the TFT array panel 100, the common electrode panel 200, and the LC layer 3, while the reflection area RA is a section of portions disposed on and under the reflective electrode 194. In the transmission areas TA, internal light, emitted from the rear of the LCD, successively passes through the TFT panel 100 and the LC layer 3 and then exits the common electrode panel 200, thus contributing to the display. In the reflection areas RA, exterior light, supplied through the front of the LCD, successively passes through the common electrode panel 200 and the LC layer 3 and is then reflected by the reflective electrodes 194 of the TFT panel 100. After the reflection, the exterior light passes through the LC layer 3 again and then exits the common electrode panel 200, thus contributing to the display.

In each reflection area RA, a group of convex-shaped protrusions 241 are formed between the lower substrate 210 and the color filter 230. The sizes of the protrusions 241 may be exactly equal to or different from each other. The protrusions 241 have very small diameters. Each protrusion 241 is formed to be similar to a hemisphere where its height is maximized at its center and decreases as a height-measuring point recedes from the center, and where its plane dimension is maximized at its bottom surface and decreases to a point at its top center as a dimension-measuring point recedes from the bottom surface.

The maximum heights of the protrusions 241 are much smaller than the thickness of the color filters 230 directly overlying the protrusions 241. For this reason, the color filters 230 can be planarized regardless of the protrusions 241, and thus a cell gap can be uniformly formed over the entire area of the display. In addition, due to the protrusions 241 formed at the reflection areas RA, the color filters 230 placed at the reflection areas RA are more thinly formed than the color filters 230 placed at the transmission areas TA. That is, the average thickness of the color filters 230 that are placed at the reflection areas RA becomes smaller than that of the color filters 230 that are placed at the transmission areas TA. Accordingly, the color filters 230 formed in this manner can reduce a difference of color tone occurring between the transmission areas TA and the reflection areas RA.

Hereinafter, the basic structure of the above-mentioned LCD will be described in more detail with reference to FIG. 2 through FIG. 4.

Figure 2:
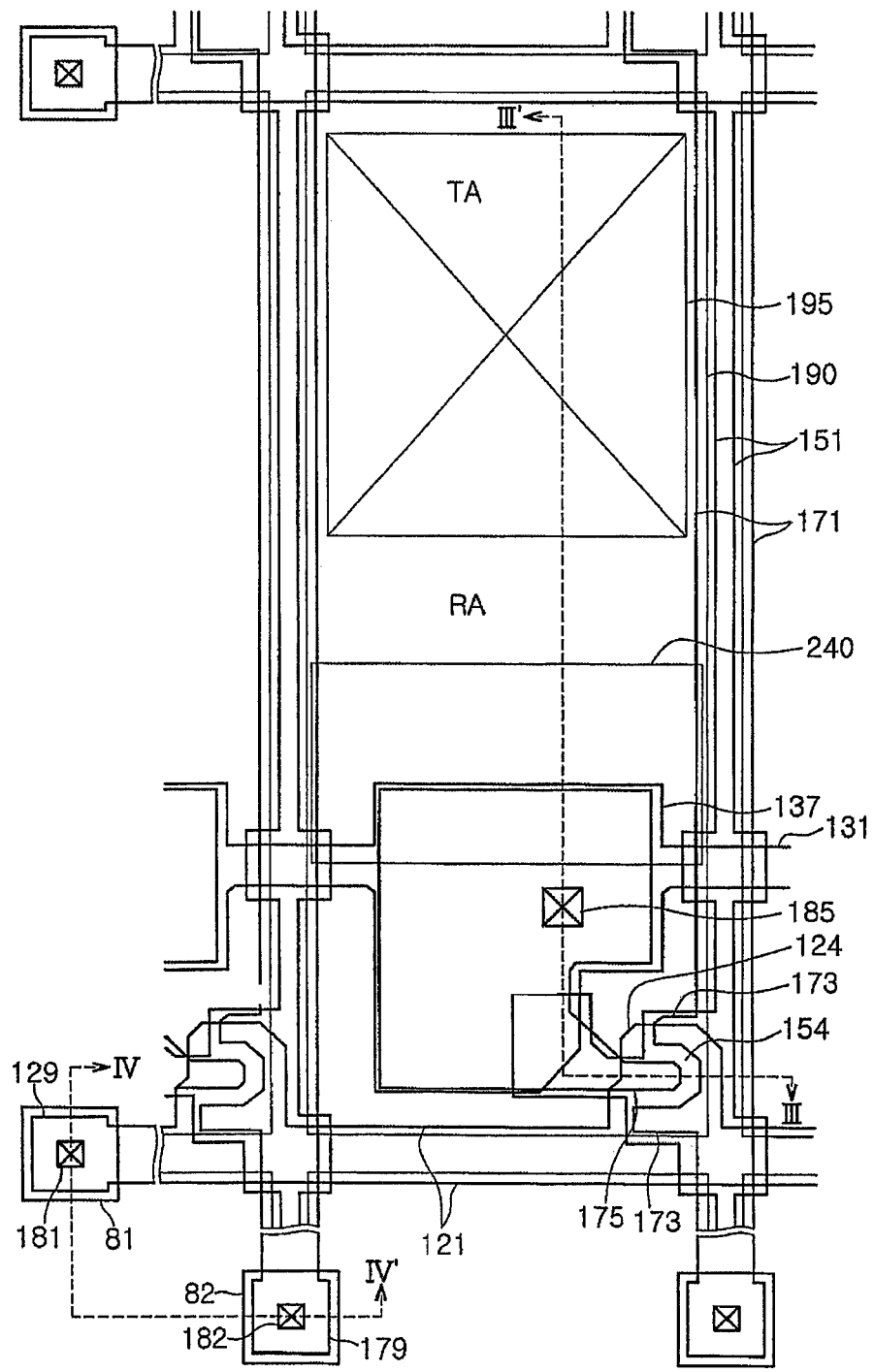
FIG. 2 is a layout view of an LCD according to an embodiment of the present invention.
Figure 3:
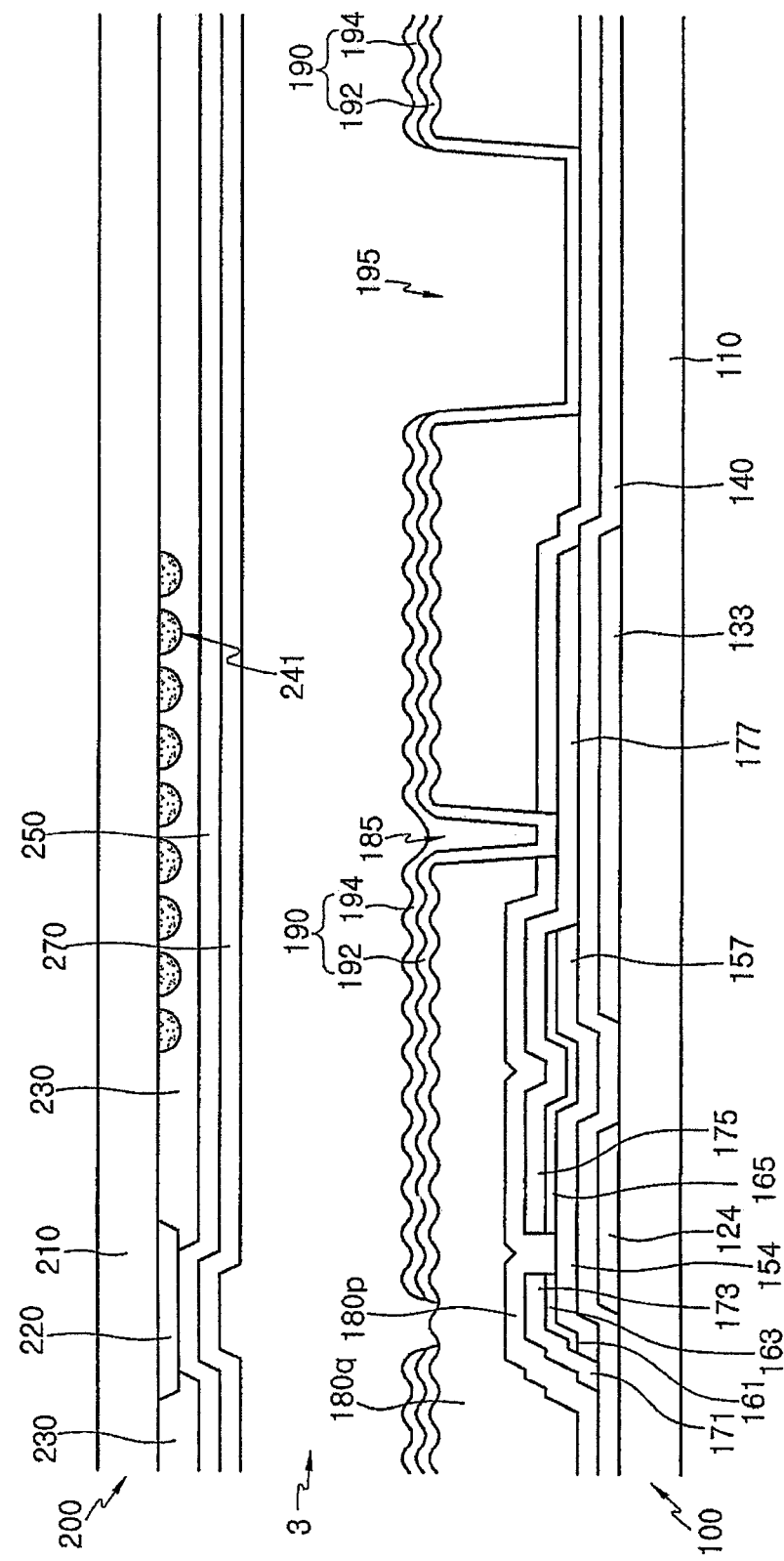
FIG. 3 is a cross-sectional view cut along III-III' of FIG. 2.
Figure 4:
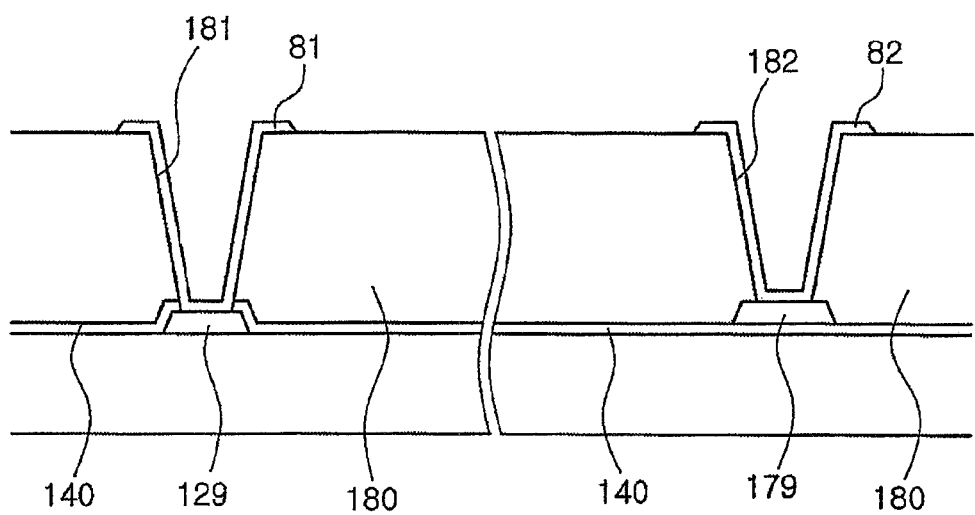
FIG. 4 is a cross-sectional view cut along IV-IV' of FIG. 2.

FIG. 2 is a layout view of an LCD according to an embodiment of the present invention, and FIG. 3 and FIG. 4 are cross-sectional views cut along III-III' and IV-IV' of FIG. 2, respectively.

Referring to FIG. 2 to FIG. 4, the LCD includes a TFT array panel 100 and a common electrode panel 200 facing each other, and an LC layer 3 interposed therebetween.

The TFT array panel 100 is configured as follows.

A plurality of gate lines 121 and a plurality of storage electrode lines 131 are formed on an insulating substrate 110 made of transparent glass or plastic.

The gate lines 121 for transmitting gate signals extend substantially in a horizontal direction. Each gate line 121 includes a plurality of gate electrodes 124 protruding upward and an end portion 129 having a relatively large dimension to be connected to a different layer or an external device. A gate driver (not shown) for generating the gate signals may be mounted on a flexible printed circuit (not shown) attached to the substrate 110, or mounted directly on the substrate 110. Otherwise, the gate driver may be integrated into the substrate 110. In this case, the gate lines 121 are directly connected to the gate driver.

The storage electrode lines 131 for receiving a predetermined voltage extend substantially parallel to the gate lines 121 and have a plurality of storage electrodes 133. Each storage electrode line 131 is placed between two adjacent gate lines, and in particular, closer to the lower-positioned gate line of the two. Each storage electrode line 131 includes a plurality of expansions 137 protruding upward and downward. The form and arrangement of the storage electrode lines 131 may be varied in other embodiments.

The gate lines 121 and the storage electrode lines 131 are preferably made of an aluminum (Al) containing metal such as Al and an Al alloy, a silver (Ag) containing metal such as Ag and a Ag alloy, a gold (Au) containing metal such as Au and a Au alloy, a copper (Cu) containing metal such as Cu and a Cu alloy, a molybdenum (Mo) containing metal such as Mo and a Mo alloy, chrome (Cr), titanium (Ti), or tantalum (Ta). The gate lines 121 and the storage electrode lines 131 may be configured as a multi-layered structure, in which at least two conductive layers (not shown) having different physical properties are included. In such a structure, one of the two conductive layers is made of a low resistivity metal, such as an Al-containing metal, a Ag-containing metal, a Cu-containing metal, or the like, in order to reduce delay of the signals or voltage drop in the gate lines 121 and the storage electrode lines 131. The other is made of a material having prominent physical, chemical, and electrical contact properties with other materials such as indium tin oxide (ITO), indium zinc oxide (IZO), etc. For example, a Mo containing metal, Cr, Ta, or Ti, etc., may be used for the formation of the same layer. Desirable examples of the combination of the two layers are a lower Cr layer and an upper Al (or Al alloy) layer, and a lower Al (or Al alloy) layer and an upper Mo (or Mo alloy) layer. Besides the above-listed materials, various metals and conductors can be used for the formation of the gate lines 121 and the storage electrode lines 131.

All lateral sides of the gate lines 121 and the storage electrode lines 131 preferably slope in the range from about 30° to 80° to the surface of the substrate 110.

A gate insulating layer 140 made of silicon nitride ($SiN_x$) or silicon oxide ($SiO_x$) is formed on the gate lines 121 and the storage electrode lines 131.

A plurality of linear semiconductors 151 made of hydrogenated amorphous silicon (abbreviated as "a-Si") or polysilicon are formed on the gate insulating layer 140. Each linear semiconductor 151 extends substantially in a vertical direction, and includes a plurality of projections 154 that extend along the respective gate electrodes 124 and have sub-projections 157 extending toward the expansions 137 of the storage electrode lines 131. The linear semiconductors 151 are enlarged in the vicinities of the gate lines 121 and the storage electrode lines 131 to cover them widely.

A plurality of linear ohmic contacts 161 and island-shaped ohmic contacts 165 are formed on the linear semiconductors 151. The ohmic contacts 161 and 165 may be made of N+ hydrogenated amorphous silicon that is highly doped with N-type impurities such as phosphorus (P), or silicide. The linear ohmic contacts 161 include a plurality of projections 163. A set of a projection 163 and an island-shaped ohmic contact 165 is placed on the projection 154 of the semiconductor 151.

All lateral sides of the semiconductors 151 and the ohmic contacts 163 and 165 slope in the range from about 30° to 80° to the surface of the substrate 110.

A plurality of data lines 171 and a plurality of drain electrodes 175 are formed on the ohmic contacts 163 and 165 and the gate insulating layer 140.

The data lines 171 for transmitting data signals extend substantially in a vertical direction to be crossed with the gate lines 121 and the storage electrode lines 131. Each data line 171 includes a plurality of source electrodes 173 extending toward the respective gate electrodes 124, and an end portion 179 having a relatively large dimension to be connected to a different layer or an external device. A data driver (not shown) for generating the data signals may be mounted on a flexible printed circuit (not shown) attached to the substrate 110, or mounted directly on the substrate 110. Otherwise, the data driver may be integrated into the substrate 110. In this case, the data lines 171 are directly connected to the gate driver.

The drain electrodes 175 separated from the data lines 171 are opposite to the source electrodes 173, centering on the gate electrodes 124. Each drain electrode 175 includes an expansion 177 having a relatively large dimension and a bar-shaped end portion. The expansions 177 of the drain electrodes 175 are overlapped with the expansions 137 of the storage electrode lines 131, and the bar-shaped end portions are partially surrounded with the curved source electrodes 173.

A gate electrode 124, a source electrode 173, a drain electrode 175, and a projection 154 of the semiconductor 151 form a thin film transistor (TFT). A TFT channel is formed in the projection 154 provided between the source electrode 173 and the drain electrode 175.

The data lines 171 and the drain electrodes 175 are preferably made of a refractory metal such as Mo, Cr, Ta, or Ti, or alloys thereof, and may be configured as multi-layered structures including a refractory metal layer (not shown) and a low resistivity conductive layer (not shown). A desirable example of the multi-layered structure is a lower layer made of one among Cr, Mo, and a Mo alloy, and an upper layer made of Al or an Al alloy. Another example is a lower layer made of Mo or a Mo alloy, an intermediate layer made of Al or an Al alloy, and an upper layer made of Mo or a Mo alloy. Besides the above-listed materials, various metals and conductors can be used for the formation of the data lines 171 and the drain electrodes 175.

All lateral sides of the data lines 171 and the drain electrodes 175 preferably slope in the range from about 30° to 80° to the surface of the substrate 110.

The ohmic contacts 163 and 165 exist only between the underlying semiconductors 151 and the overlying data lines 171 and between the overlying drain electrodes 175 and the underlying semiconductors 151, in order to reduce contact resistance therebetween. Most of the linear semiconductors 151 are formed more narrowly than the data lines 171, but partial portions thereof are enlarged in the vicinities of places to be crossed with the gate lines 121, as previously mentioned, in order to prevent the data lines 171 from being shorted. The linear semiconductors 151 are partially exposed at places where the data lines 171 and the drain electrodes 175 do not cover them, as well as between the source electrodes 173 and the drain electrodes 175.

A passivation layer 180 is formed on the data lines 171, the drain electrodes 175, and the exposed portions of the semiconductors 151. The passivation layer 180 is configured as a double-layered structure including a lower layer 180p made of an inorganic insulator such as $SiN_x$ or $SiO_x$, and an upper layer 180q made of an organic insulator. A desirable organic insulator for the upper passivation layer 180q has a low dielectric constant of below 4.0 and/or photosensitivity. The upper passivation layer 180q is provided with apertures 195 where the lower passivation layer 180p is partially exposed, and the top surface of the upper passivation layer 180q is uneven. The passivation layer 180 may be configured as a single layer made of an inorganic insulator or an organic insulator.

The passivation layer 180 is provided with a plurality of contact holes 182 and 185, through which the end portions 179 of the data lines 171 and the drain electrodes 175 are exposed, respectively. A plurality of contact holes 181 are formed in the passivation layer 180 and the gate insulating layer 140, and the end portions 129 of the gate lines 121 are exposed therethrough.

A plurality of pixel electrodes 190 and a plurality of contact assistants 81 and 82 are formed on the passivation layer 180.

Each pixel electrode 190 has a ripple-shaped profile caused by the uneven top surface of the upper passivation layer 180q, and is comprised of a transparent electrode 192 and a reflective electrode 194 overlying the transparent electrode 192. The transparent electrodes 192 are made of a transparent conductor such as ITO or IZO, and the reflective electrodes 194 are made of an opaque reflectivity conductor such as Al, Cr, Ag, or alloys thereof. However, the reflective electrodes 194 may be configured as a double-layered structure. In this case, upper layers are made of a low resistivity metal such as Al, Ag, a Ag alloy, or the like, and lower layers are made of a material having prominent contact properties with ITO and IZO, such as a Mo-containing metal, Cr, Ta, Ti, or the like.

Each reflective electrode 194 is formed only on a partial portion of the transparent electrode 192. Accordingly, the remaining portion the transparent electrode 192 is exposed. At this time, the exposed portion of the transparent electrode 192 is disposed to correspond to the aperture 195 of the upper passivation layer 180q.

The pixel electrodes 190 are physically and electrically connected to the drain electrodes 175 through the contact holes 185 in order to receive data voltages from the drain electrodes 175. The pixel electrodes 190 supplied with the data voltages generate electric fields in cooperation with a common electrode 270 of the common electrode panel 200, determining the orientations of the LC molecules in the LC layer 3 interposed between the two electrodes 190 and 270. According to the orientations of the LC molecules, the polarization of light passing through the LC layer 3 is varied. Each set of the pixel electrode 190 and the common electrode 270 forms an LC capacitor that is capable of storing the applied voltage after the TFT is turned off.

In a transflective LCD, there are transmission areas TA defined by the exposed transparent electrodes 192 and reflection areas RA defined by the reflective electrodes 194. In more detail, the transmission area TA is a section of portions disposed on and under the exposed portion of the transparent electrode 192 in the TFT array panel 100, the common electrode panel 200, and the LC layer 3, while the reflection area RA is a section of portions disposed on and under the reflective electrode 194. In the transmission areas TA, internal light, emitted from the rear of the LCD, successively passes through the TFT panel 100 and the liquid crystal layer 3, and then exits the common electrode panel 200, thus contributing to the display. In the reflection areas RA, exterior light, supplied through the front of the LCD, successively passes through the common electrode panel 200 and the LC layer 3, and is then reflected by the reflective electrodes 194 of the TFT panel 100. After the reflection, the exterior light passes through the LC layer 3 again and then exits the common electrode panel 200, thus contributing to the display.

The uneven top surface of the reflective electrodes 194 is for preventing mirror reflection. Accordingly, a mirror reflection in which some images are shown on an LCD screen is prevented.

The upper passivation layer 180q does not exist at the transmission areas TA. Accordingly, the thickness of the LC layer 3 (i.e., the cell gap) relative to the transmission areas TA is twice as large as the thickness of the LC layer 3 relative to the reflection areas RA.

To enhance the voltage storage ability of the LC capacitors, storage capacitors are further provided. The storage capacitors are implemented by overlapping the pixel electrodes 190 and the drain electrode 175 electrically connected thereto with the storage electrode lines 131.

The contact assistants 81 and 82 are connected to the end portions 129 of the gate lines 121 and the end portions 179 of the data lines 171 through the contact holes 181 and 182, respectively. The contact assistants 81 and 82 supplement adhesion between the exposed end portions 129 and 179 and exterior devices, and protect them.

The common electrode panel 200, facing the TFT array panel 100, is configured as follows.

A light-blocking member 220 called "a black matrix" is provided on an insulating substrate 210 made of transparent glass or plastic. The light-blocking member 220 prevents light from leaking out through barriers between the pixel electrodes 190, and defines aperture regions facing the pixel electrodes 190.

A plurality of protrusions 241 are formed on the substrate 210 relative to the reflection areas RA. Each protrusion 241 is shaped as a convex lens. Accordingly, when the protrusion 241 is vertically bisected, the height of the protrusion 241 is highest at its center and is reduced as a height-measuring point recedes from the center.

A plurality of color filters 230 are formed on the substrate 210, the light-blocking member 220, and the protrusions 241. Most of them are placed within the aperture regions delimited by the light blocking elements 220.

The diameter of each protrusion 241 is very small. Each protrusion 241 is formed to be similar to a hemisphere where its height is maximized at its center and decreases as a height-measuring point recedes from the center, and where its plane dimension is maximized at its bottom surface and decreases to a point at its top center as a dimension-measuring point recedes from the bottom surface. The maximum heights of the protrusions 241 are much smaller than the thickness of the color filters 230 directly overlying the protrusions 241. For this reason, the color filters 230 can be planarized regardless of the protrusions 241.

In addition, due to the protrusions 241 formed at the reflection areas RA, the color filters 230 that are placed at the reflection areas RA are more thinly formed than the color filters 230 that are placed at the transmission areas TA. That is, the average thickness of the color filters 230 that are placed at the reflection areas RA are smaller than that of the color filters 230 that are placed at the transmission areas TA. Accordingly, the color filters 230 formed in this manner reduce a difference of color tone occurring between the transmission areas TA and the reflection areas RA.

An overcoat layer 250, made of an organic material, is formed on the light-blocking member 220 and the color filters 230 to protect the color filters 230. The overcoat layer 250 may be omitted.

The common electrode 270, made of a transparent conductive material such as ITO or IZO, is formed on the overcoat layer 250.

Two alignment layers (not shown) are individually formed on the inner surfaces of the two panels 100 and 200 to align the LC molecules in the LC layer 3 in a desired direction.

One or more polarizers (not shown) are attached to the outer surfaces of the two panels 100 and 200.

The LC molecules in the LC layer 3 are aligned perpendicular or parallel to the surfaces of the panels 100 and 200.

A plurality of elastic spacers (not shown) are provided between the two panels 100 and 200 to maintain a uniform cell gap between the two panels where the LC layer 3 is eventually placed.

To assemble the TFT array panel 100 and the common electrode panel 200, a sealant (not shown) may be applied to the edges of the common electrode panel 200.

Hereinafter, the common electrode panel 200 with the protrusions 241 will be described in more detail with reference to FIG. 5A and FIG. 5B.

Figure 5A:
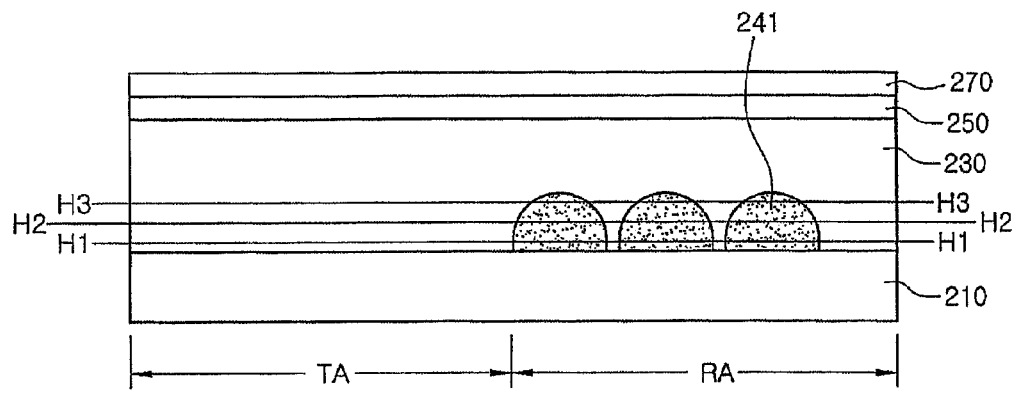
FIG. 5A shows a vertical scheme of a common electrode panel according to an embodiment of the present invention.
Figure 5B:
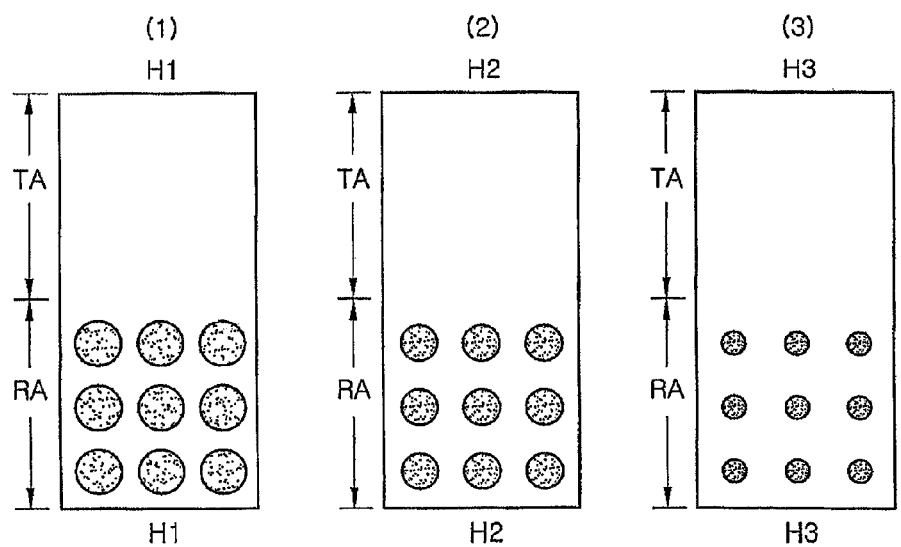
FIG. 5B shows three horizontal cross-sections cut along H1-H1, H2-H2, and H3-H3 of FIG. 5A.

FIG. 5A and FIG. 5B show a color filter 230 formed throughout a reflection area RA and a transmission area TA, and some convex-shaped protrusions 241 that are formed at the reflection area RA of the same color filter 230.

Referring to FIG. 5A showing a vertical scheme of the common electrode panel 200, one group of convex-shaped protrusions 241 is formed at the reflection area RA of the color filter 230 directly overlying those protrusions 241. The color filter 230 has a planarized top surface. A planarized overcoat layer 250 and a common electrode 270 are formed on the color filter 230. The height of each protrusion 241 is greatest at its center and deceases as a height-measuring point recedes from the center. In this embodiment, each protrusion 241 has a maximum height of about 1 µm to 2 µm. Such a height is much lower than the height of the color filter 230.

FIG. 5B shows three horizontal cross-sections cut along H1-H1, H2-H2, and H3-H3 of FIG. 5A. In a first cross-section (1) caused by the lowest cutting line H1-H1 of the three, the protrusions 241 have the largest plane dimensions. On the contrary, the protrusions 241 of a third cross-section (3) caused by the highest cutting line H3-H3 have the smallest plane dimensions. This means that the plane dimension of each protrusion 241 decreases as the dimension-measuring point becomes higher, and becomes a point at its top center. In this embodiment, each protrusion 241 has a maximum dimension of about 10 µm to 15 µm at its bottom surface.

The planarized degree of the color filter 230 may vary depending on the height of the protrusions 241 and the plane dimensions of the uppermost portions of the protrusions 241. Ordinarily, when a material is coated on a layer with a protrusion, the material tends to have a uniform thickness on the protrusion and on the layer without the protrusion. Accordingly, as the height of the protrusion and the contact dimension of the protrusion with the overlying layer also increase, a step difference occurring at a boarder of a portion with the protrusion and a portion without the protrusion becomes larger. However, in the present invention, the maximum heights of the protrusions 241 are much smaller than the thickness of the color filters 230 directly overlying the protrusions 241, and the plane dimension of each protrusion 241 becomes a point at its top center by decreasing as the dimension-measuring point recedes from its bottom surface with the largest plane dimension. For these reasons, the color filters 230 can be planarized regardless of the protrusions 241, and thus the cell gap can be uniformly formed over the entire area of the display.

Meanwhile, due to the convex-shaped protrusions 241 formed at the reflection areas RA, the average thickness of the color filters 230 that are placed at the reflection areas RA becomes smaller than that of the color filters 230 that are placed at the transmission areas TA, so that a light path difference and a color-tone difference occurring between transmission areas TA and the reflection areas RA are reduced. At this time, the total number of the protrusions 241, and the diameters, the sectional shape, and the height of each protrusion 241 act as important parameters in controlling the light path difference between the two areas RA and TA.

FIG. 6A through 6D are cross-sectional views showing process steps to manufacture the common electrode panel 200 with the convex-shaped protrusions 241 formed at the reflection areas RA.

Figure 6A:
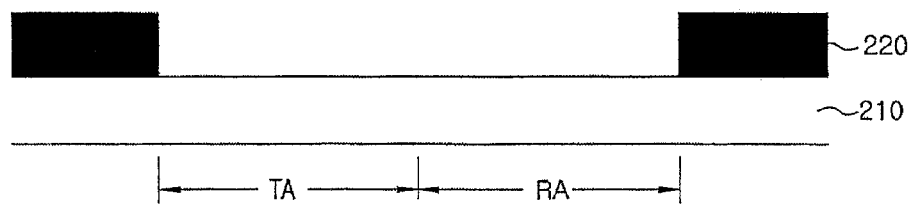
FIG. 6A through 6D are cross-sectional views showing process steps to manufacture a common electrode panel according to an embodiment of the present invention.
Figure 6B:
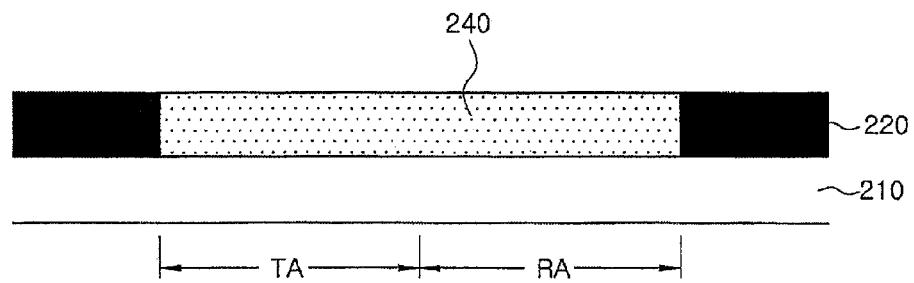

First, a light-blocking member 220 is formed on an insulating substrate 210, as shown in FIG. 6A. The light-blocking member 220 may be formed of a Cr layer, a double layer of Cr and chromium oxide ($CrO_2$), or an organic layer with black pigments.

Figure 6C:
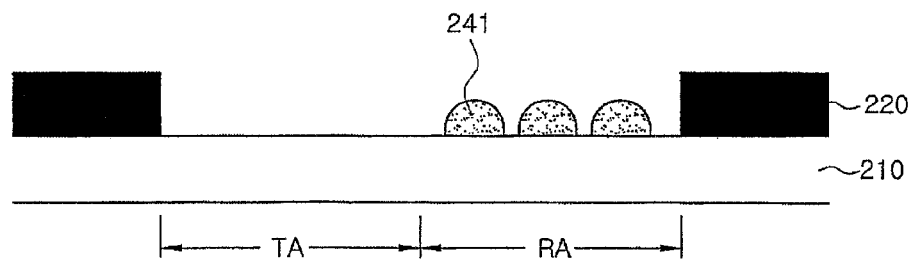
Figure 7:
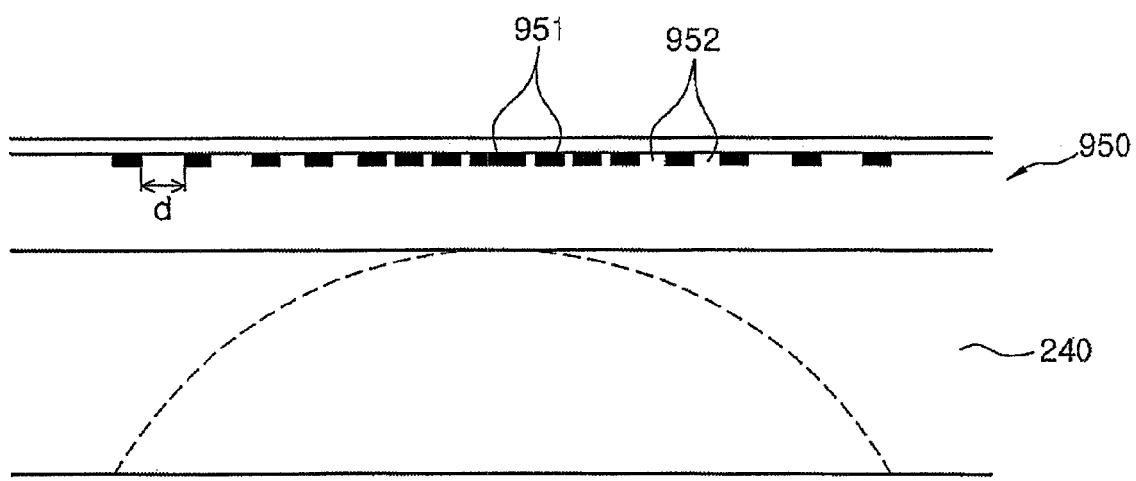
FIG. 7 shows a slit-type mask used in an embodiment of the present invention.

Next, a photosensitive organic layer 240 is formed over the substrate 210. The substrate 210 with the photosensitive organic layer 240 is then selectively exposed to light through a mask. After exposure, the substrate 210 successively undergoes a developing process and a baking process. As a result, as shown in FIG. 6C, a plurality of convex-shaped protrusions 241 are formed on the partial substrate 210 relative to a reflection area RA. In this step, the mask used to form the protrusions 241 is a slit-type mask. An example of the slit-type mask is shown in FIG. 7. Referring to FIG. 7, a slit mask 950 is disposed on the photosensitive organic layer 240 overlying the substrate 210. An upper surface of the mask 950 has light-blocking regions 951 and light-transmitting regions 952. To form the two kinds of regions in the mask, an opaque material, such as Cr, an emulsion, an oxidized metal, or silicon, is partially formed on a quartz substrate. As a result, opaque regions with the Cr, emulsion, oxidized metal, or silicon become the light-blocking regions 951, and the remaining regions without the opaque material become the light-transmitting regions 952. As shown in FIG. 7, in the slit mask, the light-transmitting regions 952, i.e., slits, are more narrowly formed as they are closer to the center where an uppermost portion of a protrusion 241 designated by a dotted line in FIG. 7 will be positioned, and the slits finally disappear at the center. Because of the slit mask 950 formed in this manner, during exposure, the amount of light entering the photosensitive organic layer 950 varies depending on the incident position. That is, the incident amount decreases as the incident position of the light becomes closer to a central portion of the photosensitive organic layer 240 where the uppermost portion of a protrusion 241 designated by the dotted line in FIG. 7 will be positioned. Accordingly, the photosensitive organic layer 240 positioned under the relatively wide slits of the mask 950 is removed in a larger amount than the photosensitive organic layer 240 positioned under the relatively narrow slits. Also, the photosensitive organic layer 240 positioned under the central portion of the mask 950 without the slit is not removed. This photosensitive organic layer 240 undergoes developing and baking processes, so that the convex-shaped protrusion is completed.

Here, the diameter and the shape of each protrusion 241 can be preferably controlled by varying the width of each slit or the intervals, and when the protrusions with preferable shapes are provided at the reflection areas RA, a difference of color tone occurring between light passing through the transmission areas TA and light passing through the reflection areas RA is reduced.

Figure 6D:
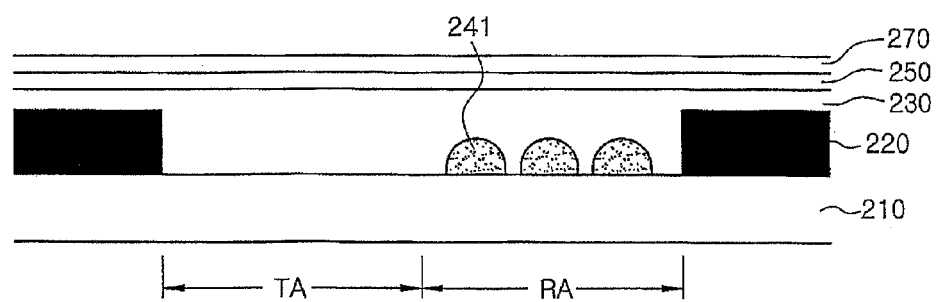

Next, as shown in FIG. 6D, a color filter 230, an overcoat layer 250, and a common electrode 270 are successively formed on the resultant of FIG. 6C. At this time, the color filter 230, the overcoat layer 250, and the common electrode 270 may be planarized.

According to the present invention, as mentioned above, the convex-shaped protrusions formed at the reflection areas RA can reduce the difference of color tone occurring between the reflection areas and the transmission areas, whilst having no influence on the planarization of the color filters.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the instant specification.

What is claimed is:

1. A display panel for a transflective liquid crystal display with a transmission area and a reflection area, comprising:
   a substrate;
   a plurality of convex-shaped protrusions that are formed on the substrate and are placed at the refection area; and
   a color filter formed on the protrusions and the substrate,
   wherein each of the protrusion has a diameter of 10 micrometers to 15 micrometers and a height of 1 micrometer to 2 micrometers, and
   wherein the color filter has a flat top surface.

2. The display panel of claim 1, wherein the protrusions include a transparent organic material.

3. The display panel of claim 1, wherein all of the protrusions have the same size.

4. The display panel of claim 1, wherein the protrusions have different sizes.

5. The display panel of claim 1, further comprising a light-blocking member that is formed on the substrate.

6. The display panel of claim 1, further comprising a common electrode that is formed on the color filter.

7. The display panel of claim 6, further comprising an overcoat layer that is formed between the color filter and the common electrode.

8. A liquid crystal display with a transmission area and a reflection area, comprising:
   a first substrate;
   a gate line and a data line that are formed on the first substrate;
   a thin film transistor that is connected to the gate line and the data line;
   a pixel electrode that is connected to the thin film transistor and includes a transparent electrode and a reflective electrode;
   a second substrate that is opposite to the first substrate;
   a plurality of convex-shaped protrusions that are placed at the refection area and are formed on the second substrate; and
   a color filter that is formed on the protrusions and on the second substrate,
   wherein each of the protrusion has a diameter of 10 micrometers to 15 micrometers and a height of 1 micrometer to 2 micrometers, and
   wherein the color filter has a flat top surface.

9. The liquid crystal display of claim 8, wherein the protrusions includes a transparent organic material.

10. The liquid crystal display of claim 8, wherein all of the protrusions have the same size.

11. The liquid crystal display of claim 8, wherein the protrusions have different sizes.

12. The liquid crystal display of claim 8, wherein the transparent electrode is formed at the transmission area and the reflection area, while the reflective electrode is formed at the reflection area.

13. The liquid crystal display of claim 12, wherein the reflective electrode is formed on the transparent electrode.

14. The liquid crystal display of claim 8, further comprising an upper passivation layer and a lower passivation layer that are formed between the thin film transistor and the pixel electrode.

15. The liquid crystal display of claim 14, wherein the upper passivation layer includes an aperture where the lower passivation layer is exposed.

16. The liquid crystal display of claim 14, wherein the upper passivation layer has an uneven top surface.

17. The liquid crystal display of claim 8, further comprising a light-blocking member that is formed on the second substrate.

18. The liquid crystal display of claim 8, further comprising a common electrode that is formed on the color filter.

19. The liquid crystal display of claim 18, further comprising an overcoat layer that is formed between the color filter and the common electrode.

20. A method of manufacturing a display panel for a liquid crystal display, comprising the steps of:
   providing a substrate;
   forming convex-shaped protrusions on the substrate; and
   forming a color filter on the protrusions and the substrate,
   wherein each of the protrusion has a diameter of 10 micrometers to 15 micrometers and a height of 1 micrometer to 2 micrometers, and
   wherein the color filter has a flat top surface.

21. The method of claim 20, wherein the step of forming convex-shaped protrusions on the substrate comprises:
   forming a photosensitive organic layer over the substrate;
   selectively exposing the substrate to light through a mask;
   developing the substrate; and
   baking the substrate.

22. The method of claim 21, wherein the mask used in the step of selectively exposing the substrate to light through a mask is a slit-type mask.

23. The method of claim 20, wherein all of the protrusions have the same size.

24. The method of claim 20, wherein the protrusions have different sizes.

25. The method of claim 20, further comprising a light-blocking member that is formed on the substrate.

26. The method of claim 20, further comprising a common electrode that is formed on the color filter.

27. The method of claim 26, further comprising an overcoat layer that is formed between the color filter and the common electrode.

28. The display panel of claim 1, wherein the protrusions are discrete and have a hemispherical cross-section.

29. The display panel of claim 28, wherein the protrusions have a hemispherical cross-section in two dimensions.

30. The display panel of claim 8, wherein the protrusions are discrete and have a hemispherical cross-section.

31. The display panel of claim 30, wherein the protrusions have a hemispherical cross-section in two dimensions.

32. The display panel of claim 20, wherein the protrusions are discrete and have a hemispherical cross-section.

33. The display panel of claim 32, wherein the protrusions have a hemispherical cross-section in two dimensions.

* * * * *